(12) United States Patent
Zhang et al.

(10) Patent No.: US 12,176,816 B2
(45) Date of Patent: Dec. 24, 2024

(54) CHARGER AND CONTROL METHOD THEREOF

(71) Applicant: GUANGDONG OPPO MOBILE TELECOMMUNICATIONS CORP., LTD., Guangdong (CN)

(72) Inventors: Jun Zhang, Guangdong (CN); Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 229 days.

(21) Appl. No.: 17/810,960

(22) Filed: Jul. 6, 2022

(65) Prior Publication Data

US 2022/0345048 A1    Oct. 27, 2022

Related U.S. Application Data

(63) Continuation of application No. PCT/CN2020/070775, filed on Jan. 7, 2020.

(51) Int. Cl.
*H02M 3/335* (2006.01)
*H02M 1/00* (2006.01)

(52) U.S. Cl.
CPC ..... *H02M 3/33523* (2013.01); *H02M 1/0003* (2021.05); *H02M 3/33573* (2021.05)

(58) Field of Classification Search
CPC ............. H02M 3/335; H02M 3/33523; H02M 3/33576; H02M 3/33592; H02M 1/0003
See application file for complete search history.

(56) References Cited

U.S. PATENT DOCUMENTS

| | | |
|---|---|---|
| 2005/0271149 A1 | 12/2005 | Dupuis |
| 2010/0033157 A1 | 2/2010 | Sander |
| 2015/0229149 A1 | 8/2015 | Fahlenkamp et al. |
| 2015/0323588 A1 | 11/2015 | Peng et al. |

(Continued)

FOREIGN PATENT DOCUMENTS

| | | |
|---|---|---|
| CN | 2317580 | 5/1999 |
| CN | 102210090 | 10/2011 |

(Continued)

OTHER PUBLICATIONS

EPO, Extended European Search Report for EP Application No. 20911797.7, Nov. 21, 2022.

(Continued)

*Primary Examiner* — Gary L Laxton
(74) *Attorney, Agent, or Firm* — Hodgson Russ LLP

(57) ABSTRACT

Provided are a charger and a control method. The charger includes: a transformer; at least one primary-side switch tube for carrying out chopping modulation on a voltage input into the transformer; a first control unit; a second control unit for generating feedback information on the basis of a voltage and/or current information output from an output end of the charger; and a first microwave unit respectively connected to the first control unit and the second control unit, and used for transmitting the feedback information to the first control unit. The first control unit is used for outputting a first control signal according to the feedback information, so as to control the turning on or the turning off of the at least one primary-side switch tube.

12 Claims, 9 Drawing Sheets

(56) References Cited

U.S. PATENT DOCUMENTS

2018/0006506 A1    1/2018  Baer et al.
2021/0119526 A1*  4/2021  Chung .............. H02M 3/33523

FOREIGN PATENT DOCUMENTS

| CN | 103368420 | 10/2013 |
| --- | --- | --- |
| CN | 106560972 | 4/2017 |
| CN | 107147298 | 9/2017 |
| CN | 110492761 | 11/2019 |
| WO | 2008044875 | 4/2008 |

OTHER PUBLICATIONS

WIPO, International Search Report and Written Opinion for PCT/CN2020/070775, Sep. 28, 2020.
EPO, Communication for EP Application No. 20911797.7, Dec. 22, 2023.

* cited by examiner

CHARGER AND CONTROL METHOD THEREOF

CROSS-REFERENCE TO RELATED APPLICATIONS

The present application is a continuation of International Patent Application No. PCT/CN2020/070775 filed Jan. 7, 2020, the entire disclosure of which is incorporated herein by reference.

TECHNICAL FIELD

Embodiments of the present application relate to the field of charging technology, and more particularly, to a charger and a control method thereof.

BACKGROUND

A charger is generally composed of a transformer, a control unit, a drive unit, a MOS tube, etc.

When driving control for the MOS tube is performed by the control unit, there are problems that a driving speed is not fast enough, dead time cannot be accurately controlled, and so on.

SUMMARY OF THE DISCLOSURE

A first aspect provides a charger comprising: a transformer; at least one primary-side switch tube configured to perform chopping modulation for a voltage input into the transformer; a first control unit; a second control unit configured to generate feedback information based on information of a voltage and/or current output from an output end of the charger; and a first microwave unit connected to the first control unit and the second control unit respectively and configured to transmit the feedback information to the first control unit; wherein the first control unit is configured to output a first control signal according to the feedback information, so as to control the at least one primary-side switch tube to be turned on or turned off.

A second aspect provides a charger comprising: a transformer; at least one primary-side switch tube connected to a primary side of the transformer; at least one secondary-side switch tube connected to a secondary side of the transformer; a first control unit configured to output a first control signal, wherein the first control signal is configured to control the at least one primary-side switch tube to be turned on or turned off; a second control unit configured to output a second control signal, wherein the second control signal is configured to control the at least one secondary-side switch tube to be turned on or turned off; and a first microwave unit connected to the first control unit and the second control unit respectively and configured to transmit a synchronization signal between the first control unit and the second control unit, wherein the synchronization signal is configured to synchronize the first control signal and the second control signal.

A third aspect provides a method of controlling a charger, the charger comprises a transformer, at least one primary-side switch tube, a first control unit, a second control unit, and a first microwave unit; the method comprises: generating, by the second control unit, feedback information based on information of a voltage and/or current output from an output end of the charger; transmitting, by the first microwave unit, the feedback information to the first control unit; and outputting, by the first control unit, a first control signal according to the feedback information to control the at least one primary-side switch tube to be turned on or turned off.

DETAILED DESCRIPTION

Technical solutions in embodiments of the present application will be described clearly and completely below in accompany with drawings. Obviously, the described embodiments are merely some embodiments of the present application, but not all embodiments. Based on embodiments of the present application, all other embodiments obtained by one of ordinary skill in the art without paying any creative work should belong to the protection scope of the present application.

In order to understand the present application more clearly, working principle and process of a charger will be introduced below with reference to FIGS. 1a-1b, so as to facilitate subsequent understanding of the solution of the present application. However, it should be understood that the content introduced below is only for better understanding of the present application, and should not form specifically limit to the present application.

Power supply conversion equipment for small portable electronic equipment and electronic appliances, such as adapters, chargers, car chargers, etc., are generally composed of shells, transformers, inductors, capacitors, control ICs, PCB boards and other components, and used to convert AC input into DC output.

Figure 1A:
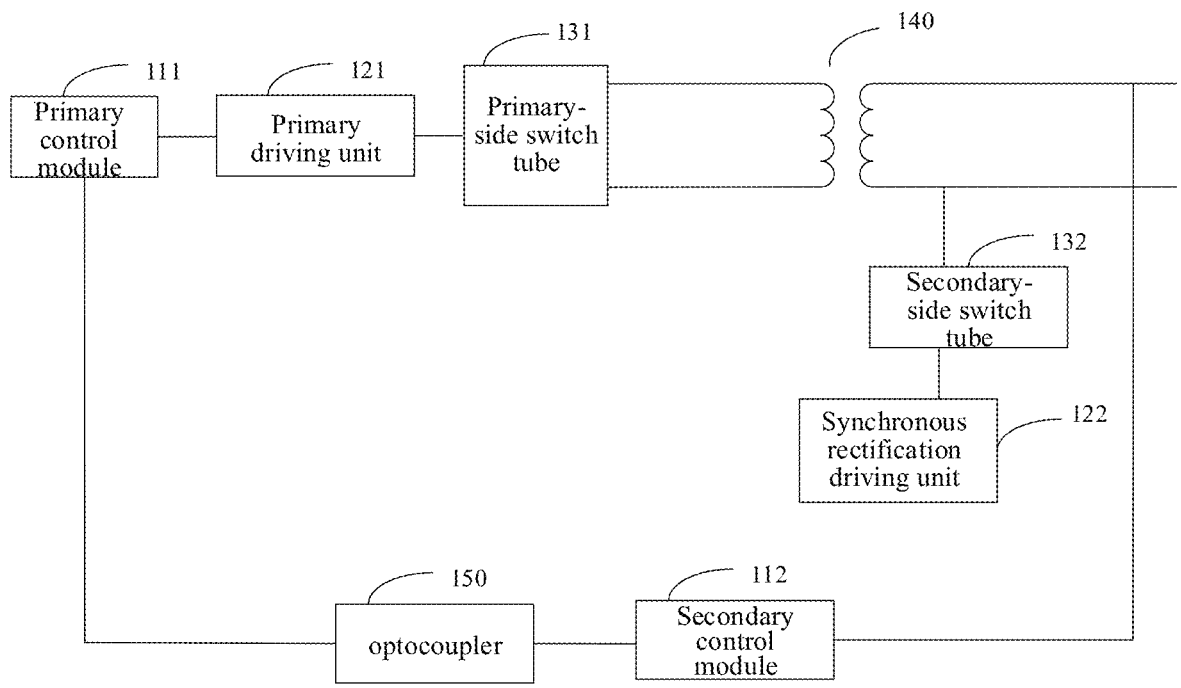
FIG. 1a is a structural schematic diagram of a charger provided by an embodiment of the present application.

As shown in FIG. 1a, in an embodiment, a charger can include a primary control module 111, a secondary control module 112, a primary driving unit 121, a synchronous rectification driving unit 122, a primary-side switch tube 131, a secondary-side switch tube 132, a transformer 140, and an optocoupler (which may also be referred to as a photoelectric coupler or a photoelectric isolator) 150.

In an embodiment of the present application, the primary-side switch tube 131 can be used to perform rectification filtering, chopping modulation, and so on for AC current input to the charger. The secondary-side switch tube 132 can be used to synchronously rectify current output by the transformer 140.

The secondary control module 112 can be used to obtain information of a voltage/current output by the transformer 140, or obtain information of a voltage/current output by an output terminal of the charger, and transmit error information (for example, the error information can be a difference value between information of actually output a voltage/current and information of required a voltage/current) to the primary control module 111 through the optocoupler 150. The primary control module 111 can convert the error information into a duty ratio or frequency of a PWM control signal, and output the PWM control signal to the primary driving unit 121 to drive the primary-side switch tube 131. Thus, output a voltage and current of the transformer 140 can be adjusted and controlled. The synchronous rectification driving unit 122 is used to drive the secondary-side switch tube 132 so that the secondary-side switch tube 132 performs synchronous rectification.

Figure 1B:
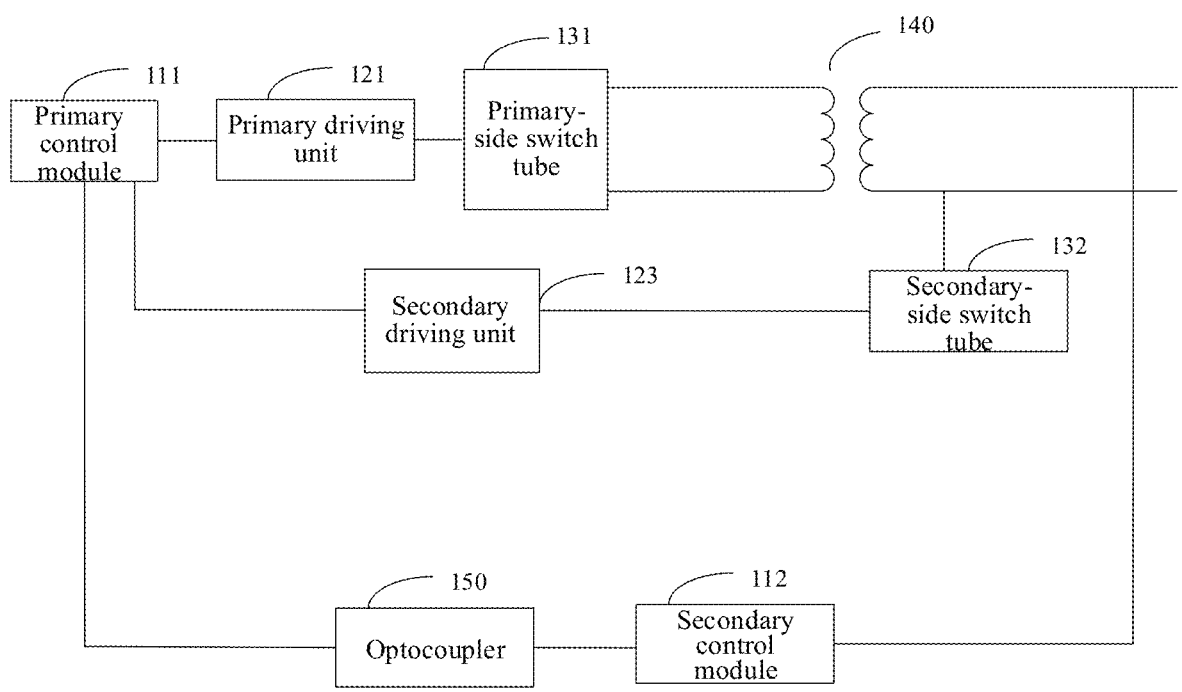
FIG. 1b is a structural schematic diagram of a charger provided by another embodiment of the present application.

As shown in FIG. 1b, in some embodiments, it is also possible to drive and control the secondary-side switch tube 132 by the primary control module 111 to implement synchronous rectification. The primary control module 111 can output a corresponding PWM signal according to the above error information to control the secondary drive unit 123, thereby driving the secondary-side switch tube 132.

The primary side switch 131 may include one or more metal oxide semiconductor field effect transistors (MOSFET), i.e., MOS transistors; for example, the primary side switch 131 may include two MOS transistors or four MOS transistors. The secondary-side switch tube 132 may also include one or more MOS transistors, for example, the secondary-side switch tube 132 may include one MOS transistor or two MOS transistors.

Electronic devices in embodiments of the present application may include, but are not limited to, a satellite or cellular telephone; a personal communication system (PCS) terminal that can combine cellular radio telephones with data processing, facsimile and data communication capabilities; a personal digital assistant (PDA) that may include a radio telephone, a pager, Internet/intranet access, a Web browser, a notepad, a calendar, and/or a Global Positioning System (GPS) receiver; conventional laptop and/or palm-sized receivers; or other electronic devices including radio telephone transceivers. In some embodiments, a device to be charged may refer to a mobile terminal device or a handheld terminal device, such as a mobile phone, a pad, and the like. In some embodiments, a device to be charged mentioned in these embodiments of the present application may refer to a chip system, and in these embodiments, a battery of the device to be charged may belong to or may also not belong to the chip system.

In addition, electronic devices may also include other devices to be charged that have charging requirements, such as mobile phones, mobile power sources (e.g., power banks, travel chargers, etc.), electric vehicles, laptops, drones, tablet computers, e-books, e-cigarettes, smart devices to be charged, small electronic products, etc. The smart devices to be charged may include, for example, watches, wristbands, smart glasses, cleaning robots, etc. The small electronic products may include, for example, wireless earphones, Bluetooth speakers, electric toothbrushes, rechargeable wireless mice. etc.

In the embodiments shown in FIG. 1a and FIG. 1b, whether the MOS transistor on the primary side and the MOS transistor on the secondary side are independently driven and controlled, or both the MOS transistor on the primary side and the MOS transistor on the secondary side are driven and controlled by the primary side control module, there are problems that driving speeds are not fast enough and it is difficult to control dead time accurately. In addition, communication between a primary grade and a secondary grade can only be performed through an optocoupler, a communication direction is single, and flexibility is not enough to transmit more information.

A charger provided by the present application adopts a microwave unit to perform transmission of a control signal, so as to improve a driving speed and realize accurate control of dead time. Moreover, when a control module outputs a high-frequency control signal, dead time of the control signal can be set to be short, such that efficiency can be improved and crosstalk of circuit will not be affected at the same time. By using a first microwave unit to control a first switch tube to be turned on and turned off, a distance between a first transmitting end and a first receiving end thereof can be set to be far, transmission of parasitic capacitance generated by the first switch tube can be avoided, and thus crosstalk of circuit can also be avoided. At the same time, since isolated communication is performed by using the first microwave unit, rapid two-way communication can be realized, information such as driving information, status information, control information, and other types can be transmitted, anti-interference performance is strong, such that rapidity, flexibility and security of communication can be improved.

A charger provided by an embodiment of the present application is introduced in detail below with reference to FIG. 2.

Figure 2:
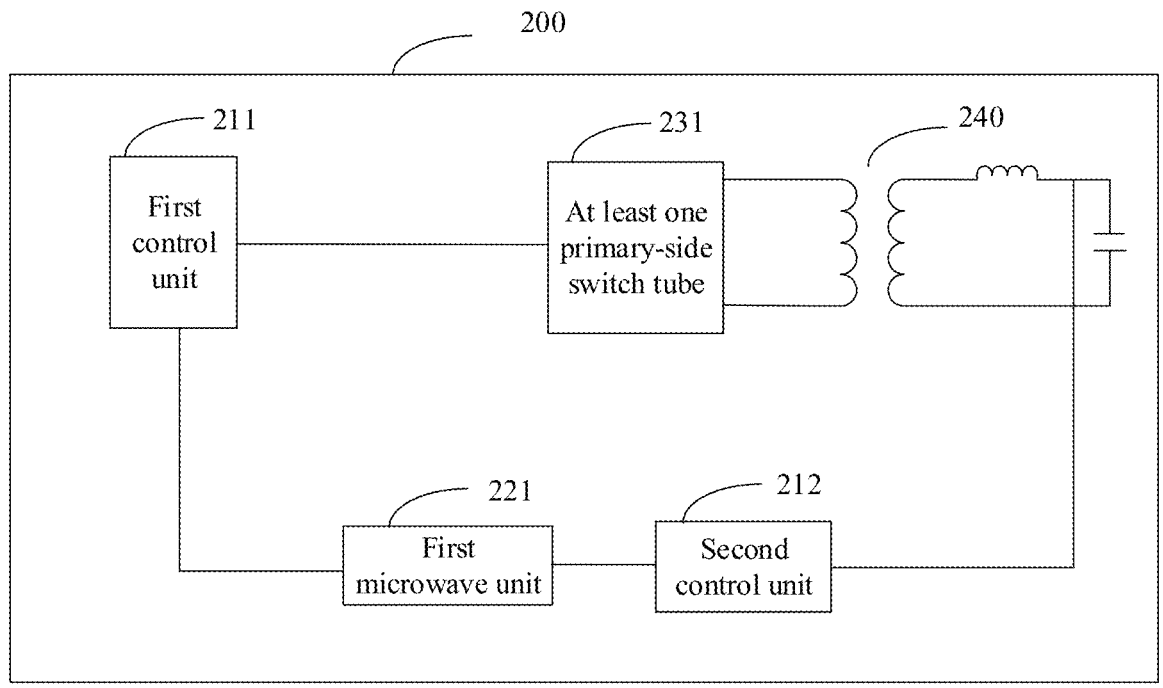
FIG. 2 is a structural schematic diagram of a charger provided by another embodiment of the present application.

As shown in FIG. 2, a charger 200 provided in this embodiment of the present application can include a first control unit 211, a second control unit 212, a first microwave unit 221, at least one first switch tube 231, and a transformer 240.

The at least one primary-side switch tube 231 is used to perform chopping modulation for a voltage input to the transformer 240.

The at least one primary-side switch tube 231 in this embodiment of the present application can be used to perform chopping modulation for the voltage input to the transformer 240, for example, a magnitude of a voltage of DC current output by a secondary-side of the transformer 240 can be changed by controlling and adjusting a duty ratio of the primary-side switch tube 231.

The second control unit 212 is used to generate feedback information based on information of a voltage and/or current output from an output end of the charger 200.

The first microwave unit 221 is connected to the first control unit 211 and the second control unit 212 respectively, and is used to transmit the feedback information to the first control unit 211.

The first microwave unit 221 in this embodiment of the present application can transmit the feedback information acquired by the second control unit 212 to the first control unit 211. The feedback information may be an actual a voltage value and/or current value at the output end of the charger, or may be a difference value between an actual output a voltage value and/or current value and an expected received a voltage value and/or current value.

The first control unit 211 is used to output a first control signal according to the feedback information to control the at least one primary-side switch tube 231 to be turned on or turned off.

In this embodiment of the present application, the feedback information output from the output end of the charger 200 can be feedbacked into the first control unit 211 through the first microwave unit 221 by the second control unit 212, and the first control unit 211 can output a first control signal according to the feedback information to control the at least one primary-side switch tube 231 to be turned on or turned off.

In the charger provided by this embodiment of the present application, during a process of transmitting control signals, a first transmitting end of the first microwave unit can convert a first control signal into a first microwave signal and transmit the first microwave signal to a first receiving end of the first microwave unit; after the first receiving end receives the first microwave signal, the first microwave signal can be converted into the first control signal, such that the converted first control signal can be used to control the at least one first switch tube to be turned on and turned off. In one aspect, since a response speed of the first microwave unit is fast, the first transmitting end thereof can convert the first control signal into the first microwave signal and quickly transmit it to the first receiving end, a driving speed is fast, and dead time can be controlled accurately; even in the condition that dead time of the first control signal is short, the first switch tube can still be quickly turned on or turned off, crosstalk of circuit will not be caused. In another aspect, since transmission of microwaves does not dependent on transmission in media, a distance between the first transmitting end and the first receiving end of the first microwave unit can be set to be far, transmission of parasitic capacitance generated by the first switch tube can be insulated, and thus crosstalk of circuit can also be avoided. At the same time, since isolated communication is performed by using a first microwave unit, rapid two-way communication can be realized, information such as driving information, status information, control information, and other types can be transmitted, anti-interference performance is strong, such that rapidity, flexibility and security of communication can be improved.

Figure 3:
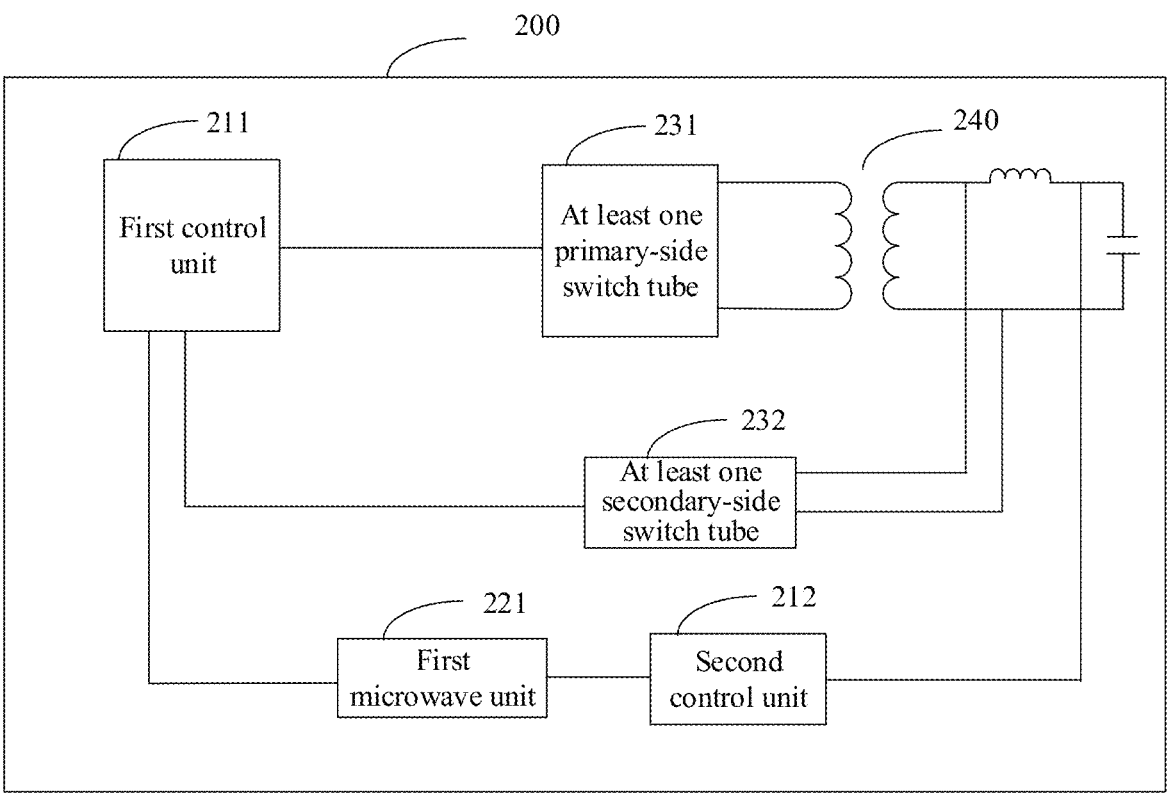
FIG. 3 is a structural schematic diagram of a charger provided by another embodiment of the present application.

Optionally, in some embodiments, as shown in FIG. 3, the charger 200 can further include at least one secondary-side switch tube 232.

The at least one secondary-side switch tube 232 is used to synchronously rectify the voltage output by the transformer 240; the first control unit is further used to output a second control signal to control the at least one secondary-side switch tube 231 to be turned on or turned off.

Optionally, in some embodiments, the first control unit 211 is further used to output the second control signal according to the information of a voltage/or current, so as to control the at least one secondary-side switch tube 231 to be turned on or turned off.

In this embodiment of the present application, the charger 200 can further include at least one secondary-side switch tube 232, and the secondary-side switch tube 232 can synchronously rectify the voltage output by the transformer 240.

If the feedback information in this embodiment of the present application is a voltage difference and/or a current difference of the DC current output by the transformer 240, the voltage difference may be a difference between a voltage actually output by a secondary-side of the transformer 240 and a voltage expected to be received, and the current difference may be a difference between current actually output by the secondary-side of the transformer 240 and current expected to be received.

For example, assuming that a voltage difference of feedback DC current received by the first control unit 211 is negative, it means that a voltage value output by the secondary-side of the transformer 240 is small at this time, and the first control unit 211 can control to increase output duration of a high electric level within one cycle, such that duration when the primary-side switch tube 231 is in a conducting state is increased, and thus the voltage value of the DC current output by the secondary-side of the transformer is increased; assuming that the voltage difference of the feedback DC current received by the first control unit 211 is positive, it means that the voltage value output by the secondary-side of the transformer 240 is great at this time, and the first control unit 211 can control to reduce the output duration of the high electric level within one cycle, such that the duration when the primary-side switch tube 231 is in a conducting state is reduced, and thus the voltage value of the DC current output by the secondary-side of the transformer is reduced.

In some implementing manners, the feedback information in this embodiment of the present application can also be a voltage value and/or a current value of the DC current output by the secondary-side of the transformer 240, the first microwave unit 221 can feedback the voltage value and/or the current value to the first control unit 211, and the first control unit 211 can compare a received a voltage value and/or current value with a preset a voltage value and/or current value. Assuming that after the feedbacked a voltage value of the DC current received by the first control unit 211 is compared with the preset a voltage value, if it is determined that the voltage value of the DC current output by the secondary-side of the transformer is smaller at this time, the first control unit 211 can control to increase output duration of a high electric level within one cycle, such that duration when the primary-side switch tube 231 is in a conducting state is increased, and thus the voltage value of the DC current output by the secondary-side of the transformer is increased; after the feedbacked a voltage value of the DC current received by the first control unit 211 is compared with the preset a voltage value, if it is determined that the voltage value of the DC current output by the secondary-side of the transformer is greater at this time, the first control unit 211 can control to reduce the output duration of the high electric level within one cycle, such that duration when the primary-side switch tube 231 is in a conducting state is reduced, and thus the voltage value of the DC current output by the secondary-side of the transformer is reduced.

It can be understood that conduction time of the at least one primary-side switch tube 231 may have association relation with the DC current output by the secondary-side of the transformer 240, that is, the longer the conduction time of the at least one primary-side switch tube 231, the larger the DC current output by the secondary-side of the transformer 240; the shorter the conduction time of the at least one primary-side switch tube 231, the smaller the DC current output by the secondary-side of the transformer 240.

In this embodiment of the present application, the first microwave unit 221 can also include a transmitting end and a receiving end, the transmitting end of the first microwave unit 222 can convert a digital signal sent from the second control unit 212 into a microwave signal and transmit it to a receiving end of the first microwave unit 211. After a third receiving end receives the microwave signal, the microwave signal can be converted into a digital signal and sent to the first control unit 211, so that the first control unit 211 can control output time of a high electric level and/or a low electric level of a first control signal based on the received signal.

Figure 4:
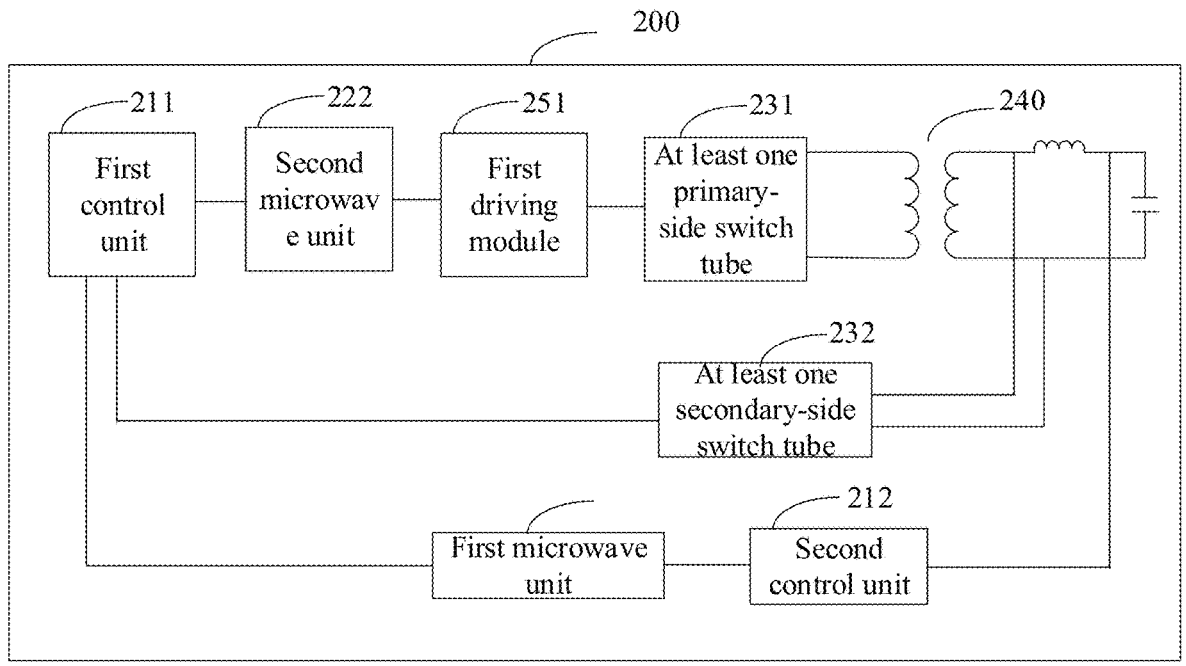
FIG. 4 is a structural schematic diagram of a charger provided by another embodiment of the present application.

Optionally, in some embodiments, as shown in FIG. 4, the charger 200 can further include a second microwave unit 222 and a first driving module 251.

The second microwave unit 222 is connected to the first control unit.

The first driving module 251 is connected to the first control unit and the at least one primary-side switch tube respectively.

The second microwave unit 222 is used to transmit the first control signal output by the first control unit 211 to the first driving module 251, thereby enabling the first driving module 251 to drive the at least one primary-side switch tube 231 to be turned on or turned off.

The charger 200 in this embodiment of the present application can further include the second microwave unit 222 and the first driving module 251, a transmitting end of the second microwave unit 222 can perform conversion for the first control signal output by the first control unit 211, convert it to a microwave signal and transmit it to a receiving end of the second microwave unit 222; when the receiving end receives the microwave signal, it can be converted into the first control signal, and the first control signal is transmitted to the first driving module 251, such that the at least one primary-side switch tube can be driven or controlled to be turned on or turned off.

Figure 5:
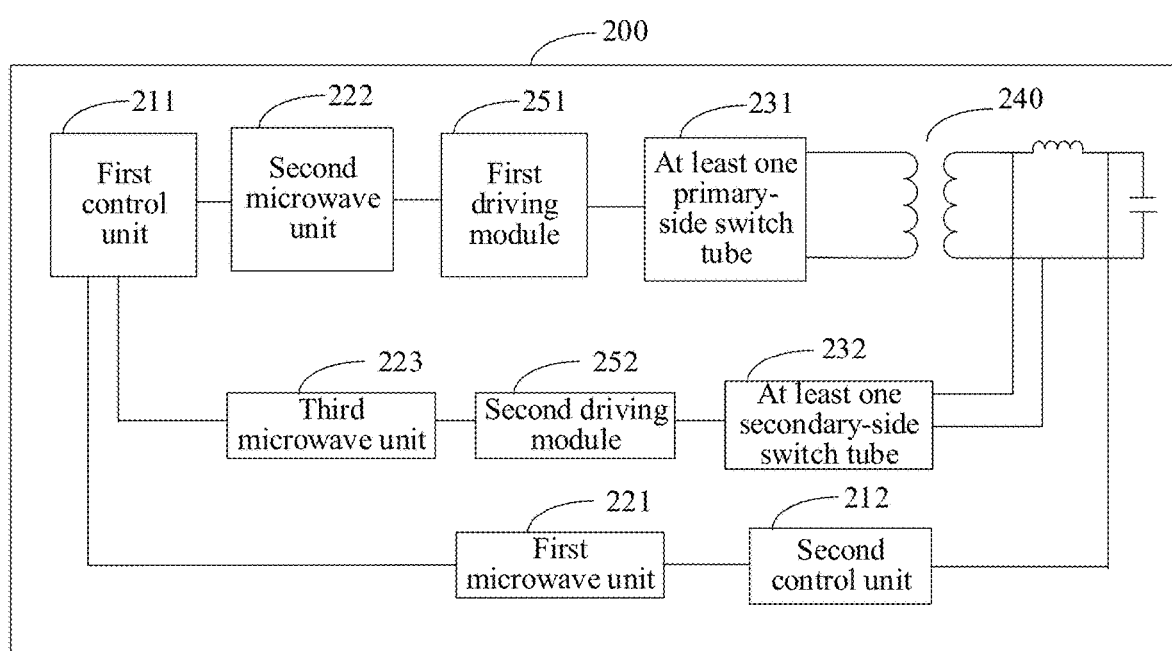
FIG. 5 is a structural schematic diagram of a charger provided by another embodiment of the present application.

Optionally, in some embodiments, as shown in FIG. 5, the charger 200 can further include a third microwave unit 223 and a second driving module 252.

The third microwave unit 223 is connected to the first control unit 211.

The second driving module 252 is connected to the third microwave unit 223 and the at least one secondary-side switch tube 232 respectively.

The third microwave unit 223 is used to transmit a second control signal output by the first control unit 211 to the second driving module 252, thereby enabling the second driving module 252 to drive the at least one secondary-side switch tube 232 to be turned on or turned off.

In this embodiment of the present application, the first control unit 211 can also control at least one secondary-side switch tube 232 to be turned on or turned off for example, by a transmitting end of the third microwave unit 223, the control signal output by the first control unit 211 can be converted; it is converted into a microwave signal and transmitted to a receiving end of the second microwave unit 222; the receiving end receives the microwave signal and can convert it into the control signal, and the control signal is transmitted to the second driving module 252, such that at least one secondary-side switch tubed can be driven or controlled to be turned on or turned off.

The following will be described in detail with FIG. 6a and FIG. 6b, respectively.

Figure 6A:
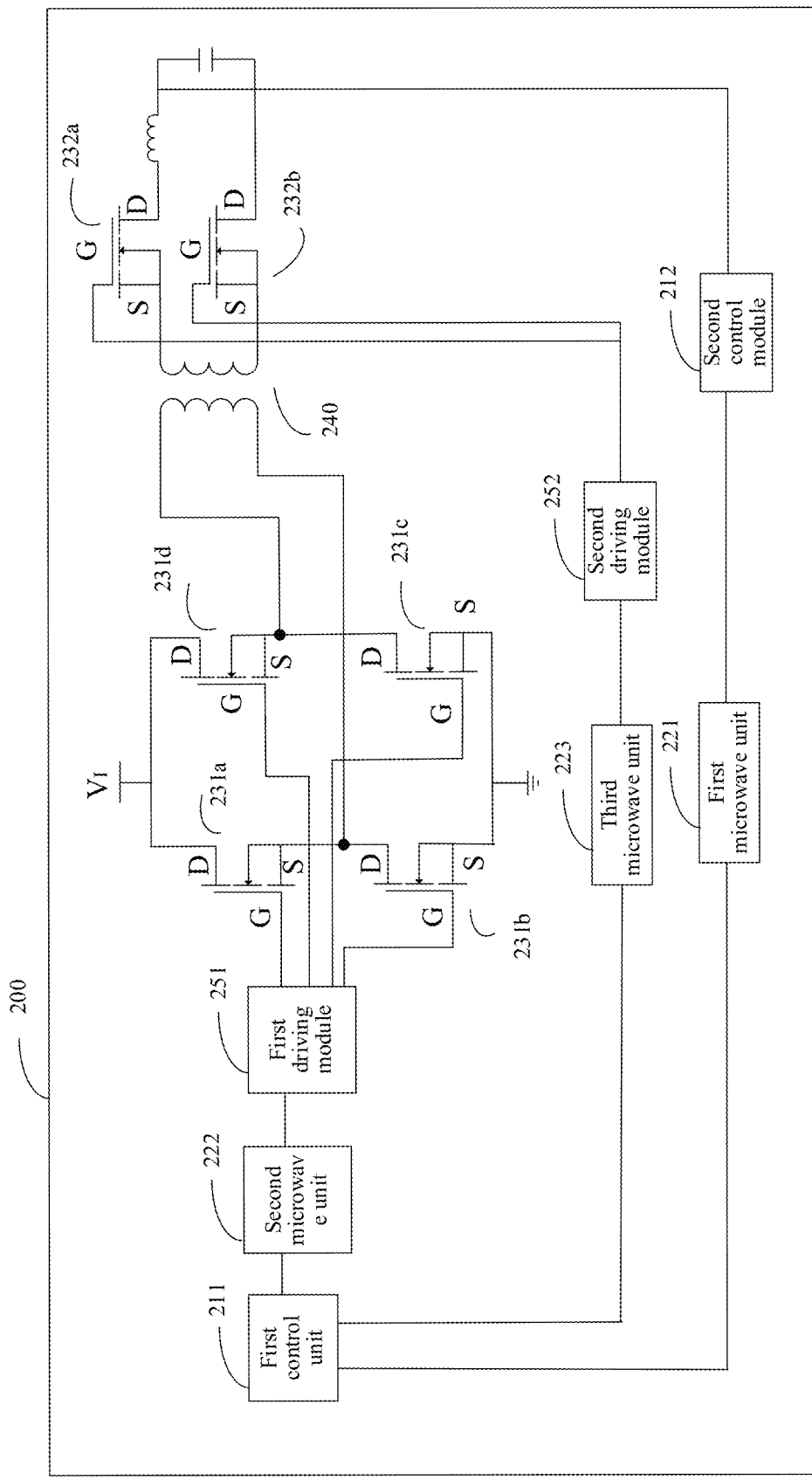
FIG. 6a is a structural schematic diagram of a charger provided by another embodiment of the present application.

In this embodiment of the present application, as shown in FIG. 6a, the driving circuit 200 can further include the first driving module 251 and the second driving module 252. Among them, the first driving module 251 can amplify a control signal output by the receiving end of the first microwave unit 221, so that the amplified signal can control the primary-side switch tube 231 to be turned on or turned off the second driving module 252 can amplify a control signal output by the third microwave unit 223, so that the amplified signal can control the secondary-side switch tube 232 to be turned on or turned off.

It can be understood that the first driving module 251 and/or the second driving module 252 in the embodiment of the present application can be used to amplify the control signal output by the first control unit 211, that is, control capability of the control signal can be increased, so that it can control the switch tubes.

The driving modules in this embodiment of the present application may be charge pump bootstrap control circuits, control chips, and so on.

Figure 6B:
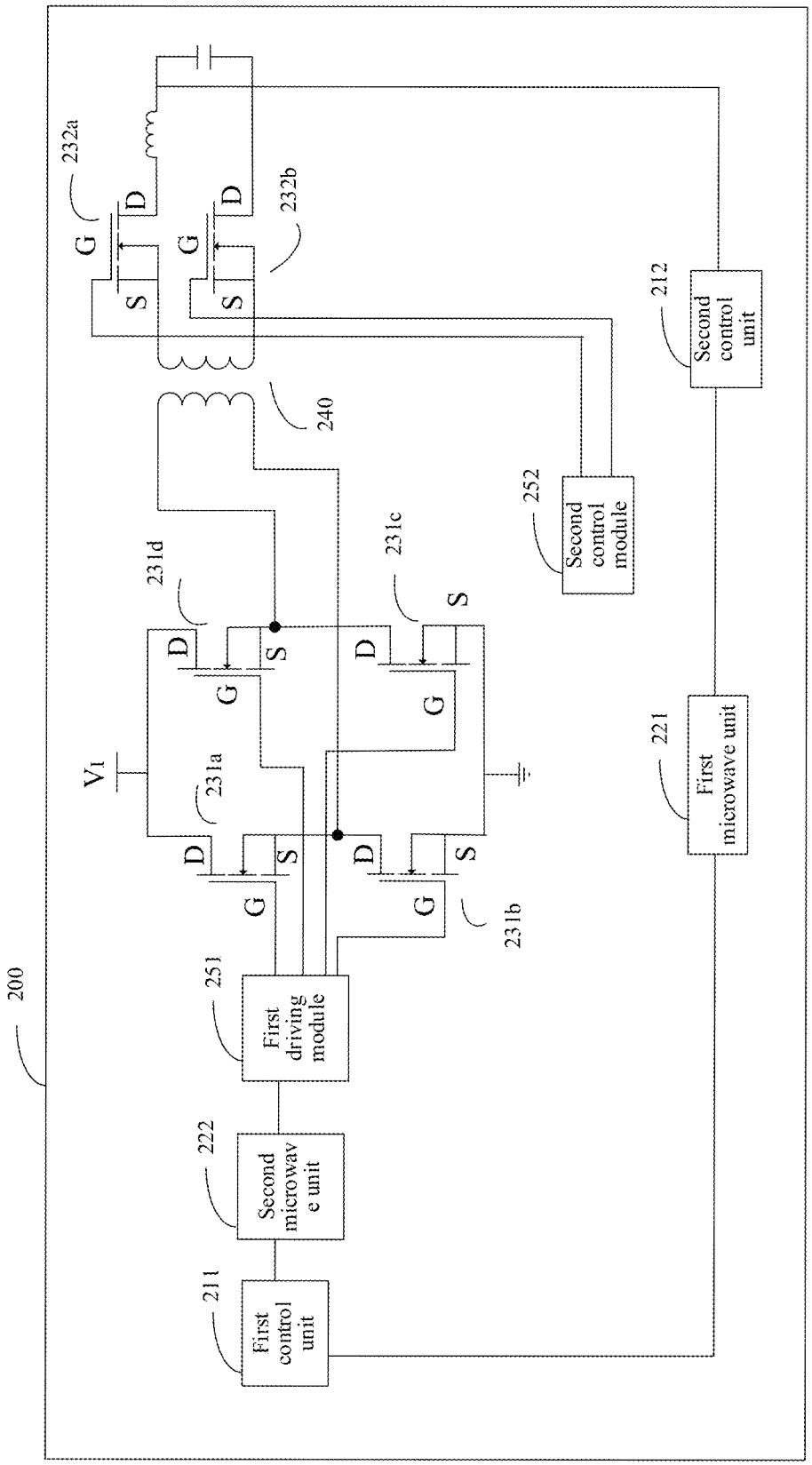
FIG. 6b is a structural schematic diagram of a charger provided by another embodiment of the present application.

As shown in FIG. 6b, which is a structural schematic diagram of a charger provided by another embodiment of the present application. In this embodiment of the present application, after the second control unit 212 transmits the collected feedback information to the first control unit 211 through the first microwave unit 221, the first control unit 211 can control output time of a high electric level and/or a low electric level of the first control signal according to the received feedback information, so that the second driving module 252 can determine whether to send a driving signal to turn on at least one second switch tube 232 according to whether at least one switch tube 231 connected to the primary-side of the transformer is turned on.

The second driving module 252 in this embodiment of the present application may be a synchronous rectification driving unit.

It should be understood that, in this embodiment of the present application, at least one driving unit may also be included in FIGS. 2 to 4. For example, for FIG. 2, the driving unit may be located between the first control unit 211 and at least one primary-side switch tube 231 to amplify the control signal output by the first control unit 211, so that it can control at least one primary-side switch tube 231.

For FIG. 3 to FIG. 4, two driving units can be included; wherein one driving unit may be located between the first control unit 211 and the primary-side switch tube 231 to amplify the control signal output by the first control unit 211, so that it can control the primary-side switch tube 231; the other driving unit may be located between the first control unit 211 and at least one secondary-side switch tube 232 to amplify the control signal output by the first control unit 211, so that it can control the at least one secondary-side switch tube 232.

It is explained above that a transmitting end of a microwave unit in an embodiment of the present application can convert a control signal into a microwave signal, and transmit the microwave signal to a receiving end, and the receiving end can convert the microwave signal into the control signal to control a switching tube to be turned on or turned off, so that a transformer connected to the switch tube can continuously store and release energy. In addition, the microwave unit in this embodiment of the present application can also be used to isolate parasitic capacitance generated by the switch tube, which will be described in detail below.

Optionally, in some embodiments, the second microwave unit 222 is further used to transmit the first control signal to control the at least one primary-side switch tube 231 to be turned on or turned off, and isolate parasitic capacitance generated by the at least one primary-side switch tube 231.

Optionally, in some embodiments, the third microwave unit 223 is further used to transmit the second control signal to control the at least one secondary-side switch tube 232 to be turned on or turned off, and isolate parasitic capacitance generated by the at least one secondary-side switch tube 232.

In the embodiment of the present application, the first control unit 211 can output a high electric level signal and transmit the signal to at least one primary-side switch tube 231 through the second microwave unit 222 to control the primary-side switch tube 231 to be turned on; the first control unit 211 can also output a high electric level signal and transmit the signal to at least one secondary-side switch tube 232 through the third microwave unit 223 to control the secondary-side switch tube 232 to be turned on.

In this embodiment of the present application, a primary-side of the transformer 240 may refer to a side connected to at least one primary-side switch tube 231, and a secondary side of the transformer 240 may refer to a side connected to at least one secondary-side switch tube 232.

The second microwave unit 222 in this embodiment of the present application, during a process of controlling at least one primary-side switch tube 231 to be turned on or turned off, can also isolate parasitic capacitance generated by at least one primary-side switch tube 231, that is, the parasitic capacitance generated by the at least one primary-side switch tube 231 can be isolated from being transmitted to other circuit modules, for example, to at least one secondary-side switch tube 232, so as to avoid circuit crosstalk; the third microwave unit 223, during a process of controlling at least one secondary-side switch tube 232 to be turned on or turned off, can also isolate parasitic capacitance generated by at least one secondary-side switch tube 232, that is, the parasitic capacitance generated by the at least one secondary-side switch tube 232 can be isolated from being transmitted to other circuit modules, for example, to at least one primary-side switch tube 231, so as to avoid circuit crosstalk.

As shown in FIG. 6a, which is a structural schematic diagram of a charger provided by an embodiment of the present application. The primary-side switch tube in the charger in this embodiment of the present application may be a switch tube included in a full-bridge circuit. As shown in FIG. 4, a full-bridge circuit in an embodiment of the present application may include an N-channel MOS transistor 231a, an N-channel MOS transistor 231b, an N-channel MOS transistor 231c, and an N-channel MOS transistor 231d.

In this embodiment of the present application, when the first control unit 211 outputs a high electric level signal, if pins of the N-channel MOS transistor 231a and of the N-channel MOS transistor 231c are turned on, the high electric level signal can be converted into a microwave signal through the transmitting end of the second microwave unit 222, and the microwave signal is transmitted to the receiving end of the second microwave unit 222. After the receiving end receives the microwave signal, the microwave signal can be converted into a first control signal, and the first control signal is transmitted to the N-channel MOS transistor 231a and the N-channel MOS transistor 231c. At this time, since gate a voltage of the N-channel MOS transistor 231a is higher than source a voltage thereof, and gate a voltage of the N-channel MOS transistor 231c is higher than source a voltage thereof, thus it is possible to make the N-channel MOS transistor 231a and the N-channel MOS transistor 231c be turned on.

When the first control unit 211 outputs a high electric level signal, if pins of the N-channel MOS transistor 231b and of the N-channel MOS transistor 231d are turned on, the high electric level signal can be converted into a microwave signal through the transmitting end of the second microwave unit 222, and the microwave signal is transmitted to the receiving end of the second microwave unit 222. After the receiving end receives the microwave signal, the microwave signal can be converted into a second control signal, and the second control signal is transmitted to the N-channel MOS transistor 231b and the N-channel MOS transistor 231d. At this time, since gate a voltage of the N-channel MOS transistor 231b is higher than source a voltage thereof, and gate a voltage of the N-channel MOS transistor 231d is higher than source a voltage thereof, thus it is possible to make the N-channel MOS transistor 231b and the N-channel MOS transistor 231d be turned on.

It should be understood that full-bridge circuit diagrams in embodiments of the present application are not limited to that shown in FIG. 6a or FIG. 6b, and may also be circuit diagrams in other forms, which should not be particularly limited to the present application.

Optionally, in some embodiments, the first microwave unit and/or the second microwave unit and/or the third microwave unit includes an integrated circuit (IC) chip, and the IC chip is packaged with an extremely high frequency antenna.

An IC chip in an embodiment of the present application can be packaged with an extremely high frequency (EHF) antenna, which includes a transmitting antenna and a receiving antenna, that is, a transmitting end and a receiving end in this embodiment of the present application. Thus, the microwave unit can realize high-speed data wireless transmission (e.g., a transmission speed up to 6 GB/s) based on a high carrier frequency (e.g., 60 GHz).

In this embodiment of the present application, it can be understood that, taking the first microwave unit 221 as an example, the first transmitting end of the first microwave unit 221 can convert the first control signal output by the first control unit 211 into the first microwave signal, the microwave signal can propagate without relying on medium in a propagation process, and a propagation speed in a vacuum is equal to the speed of light. Therefore, after the first control signal is converted into the first microwave signal by the first transmitting end of the first microwave unit 221, the first microwave signal can be quickly transmitted to the first receiving end of the first microwave unit 221, and the first receiving end of the first microwave unit 221 then converts the first microwave signal into a first control signal, so that the at least one first switch tube 231 can be enabled to respond quickly.

The first switch transistor 231 and/or the second switch transistor 232 in embodiments of the present application may be insulated gate bipolar transistors (IGBT), MOS transistors, triodes, etc., which are not specifically limited in the present application.

Optionally, in some embodiments, the charger 200 can further include a first isolation unit and a second isolation unit.

The first isolation unit is used to isolate parasitic capacitance generated by the at least one primary-side switch tube 231; the second isolation unit is used to isolate parasitic capacitance generated by the at least one secondary-side switch tube 232. Among them, the first isolation unit has an end connected to the second microwave unit 222, and another end connected to the at least one primary-side switch tube 231; the second isolation unit has an end connected to the third microwave unit 223, and another end connected to the at least one secondary-side switch tube 232.

In this embodiment of the present application, the first isolation unit can isolate transmission of parasitic capacitance generated by the at least one primary-side switch tube 231 under a high frequency to other circuit modules, such as the at least one secondary-side switch tube 232; the second isolation unit can isolate transmission of parasitic capacitance generated by the at least one secondary-side switch tube 232 under a high frequency to other circuit modules, such as the at least one primary-side switch tube 231. Thus, circuit crosstalk can be further avoided.

In this embodiment of the present application, since a transmission speed of microwave is fast, a distance between the first transmitting end and the first receiving end of the second microwave unit 222 can be set to be far, for example, can be larger than a first threshold. Therefore, the second microwave unit 221 itself can isolate transmission of parasitic capacitance generated by the primary-side switch tube 231 to other circuit modules, such as the secondary-side switch tube 232; the arrangement of the first isolation unit can further isolate transmission of parasitic capacitance generated by the primary-side switch tube 231 to other circuit modules, such as the secondary-side switch tube 232.

Similarly, a distance between a third transmitting end and a third receiving end of the third microwave unit 223 can also be set to be far, for example, can be larger than a second threshold. Therefore, the third microwave unit 223 itself can isolate transmission of parasitic capacitance generated by the secondary-side switch tube 232 to other circuit modules, such as the primary-side switch tube 231; the arrangement of the second isolation unit can further isolate transmission of parasitic capacitance generated by the secondary-side switch tube 232 to other circuit modules, such as the primary-side switch tube 231.

Optionally, in some embodiments, the first control unit 211 includes: a first sub-control unit 211*a*, which is connected to the second microwave unit 222 and used to output the first control signal to the second microwave unit 222, and is further used to control output time of the first control signal; and a second sub-control unit 211*b*, which is connected to the third microwave unit 223 and used to output the second control signal to the third microwave unit 223, and is further used to control output time of the second control signal.

In this embodiment of the present application, the second microwave unit 222 and the third microwave unit 223 can also control and transmit the control signals through two control units respectively. For example, the first sub-control unit 211*a* may transmit the first control signal to the second microwave unit 222; based on the first control signal transmitted by the first sub-control unit 211*a*, the transmitting end of the second microwave unit 222 can convert it into a first microwave signal, and transmit it to the receiving end of the second microwave unit 222; after the receiving end receives the first microwave signal, the first microwave signal can be converted into the first control signal, and the first control signal is transmitted to the primary-side switch tube 231 to control the primary-side switch tube 231 to be turned on or turned off. The second sub-control unit 211*b* can transmit the second control signal to the third microwave unit 223; based on the second control signal transmitted by the second sub-control unit 211*b*, the third transmitting end of the third microwave unit 223 can convert it into the second microwave signal, and transmit it to the third receiving end of the third microwave unit 223; after the third receiving end receives the second microwave signal, the second microwave signal can be converted into the second control signal, and the second control signal is transmitted to the secondary-side switch tube 232 to control the secondary-side switch tube 232 to be turned on or turned off.

It should be noted that the first sub-control unit 211*a* and the second sub-control unit 211*b* can communicate with each other, so that the first sub-control unit 211*a* and the second sub-control unit 211*b* can output control signals more accurately.

Optionally, in some embodiments, dead time of the first control signal and/or the second control signal is less than a first threshold.

Figure 8:
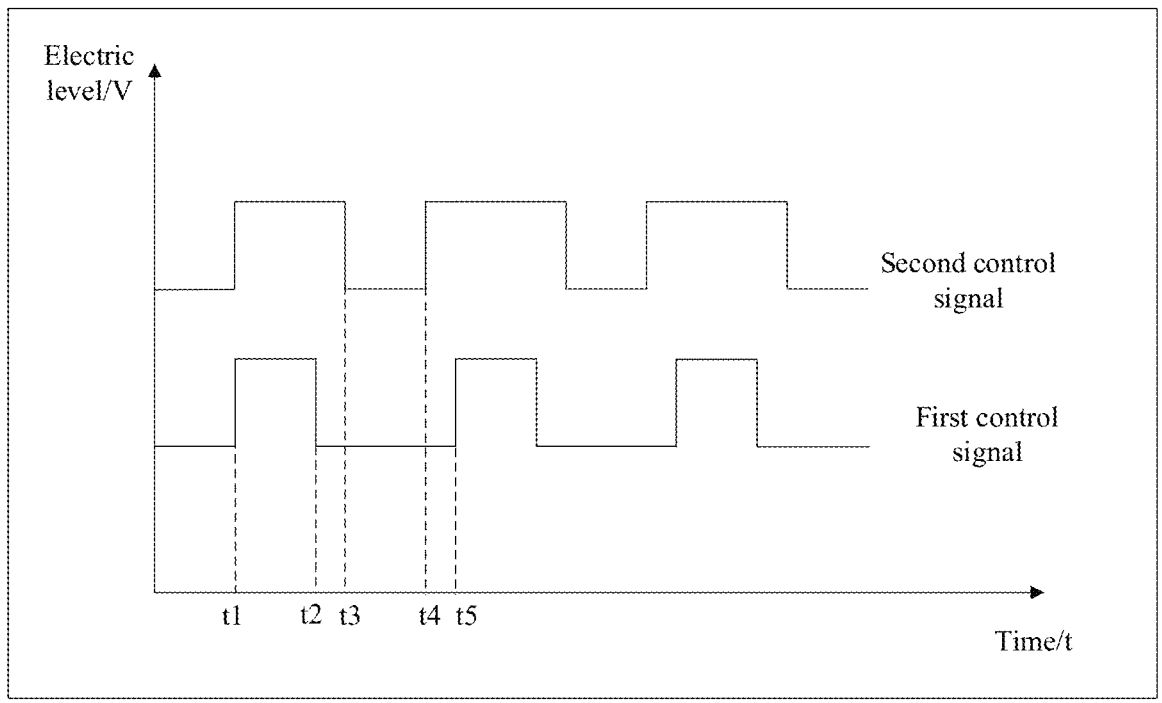
FIG. 8 is a schematic diagram of a control signal output by a control unit provided by an embodiment of the present application.

Illustrated with reference to FIG. 8, during a time period (t1-t2), the first sub-control unit 211*a* can output a high electric level to control the primary-side switch tube 231 to be in an on-state. At the time point t2, the first sub-control unit 221*a* can output a low electric level to control the primary-side switch tube 231 to be in an off-state. It can be seen from FIG. 8 that when the first sub-control unit 211*a* outputs the low electric level at the time point t2, the second sub-control unit 211*b* does not output a low electric level instantaneously, but starts to output a low electric level at the time point t3, so as to control the secondary-side switch tube 232 to be turned on, such that energy stored in the primary side of the transformer 240 can be released to the secondary side of the transformer 240.

Among them, the time period (t2-t3) is called dead time. During the dead time, the first sub-control unit 211*a* can output a low electric level, and the second sub-control unit 211*b* can output a high electric level. The purpose is to control the secondary-side switch tube 232 to be turned on after the primary-side switch tube 231 is completely turned off, so as to prevent parasitic capacitance generated due to turning-on of the secondary-side switch tube 232 in advance from being transmitted to the primary-side switch tube 231 when energy stored in the primary side of the transformer 240 is released to the secondary side, which may result in mis-turning-on of the primary-side switch tube 231 can cause circuit crosstalk.

In this embodiment of the present application, the first sub-control unit 211*a* and the second sub-control unit 211*b* can communicate with each other. For example, the first sub-control unit 211*a* can notify the first sub-control unit 211*a* to end outputting a high electric level and starts to outputting a low electric level at the time point t2. After receiving the notification from the first sub-control unit 211*a*, the second sub-control unit 211*b* can start to output the low electric level after preset dead time, that is, can start to output the low electric level at the time point t3, so as to prevent parasitic capacitance generated due to turning-on of the secondary-side switch tube 232 in advance from being transmitted to other circuit module, such as the primary-side switch tube 231, when energy stored in the primary side of the transformer 240 is released to the secondary side, which may cause circuit crosstalk.

Alternatively, the first sub-control unit 211*a* ends outputting the high electric level at the time point t2, and at any time point within the dead time period (t2-t3), notifies the second sub-control unit 211*b* to output the low electric level at the time point t3, so as to prevent parasitic capacitance generated due to turning-on of the secondary-side switch tube 232 in advance from being transmitted to other circuit module, such as the primary-side switch tube 231, when energy stored in the primary side of the transformer 240 is released to the secondary side, which may cause circuit crosstalk.

In this embodiment of the present application, the first sub-control unit 211*a* can also receive a synchronization signal sent by the second sub-control unit 211*b*, so as to determine output time for outputting a high electric level and/or a low electric level.

Optionally, in some embodiments, a preset frequency of the first control signal and/or the second control signal is greater than a second threshold.

Figure 7:
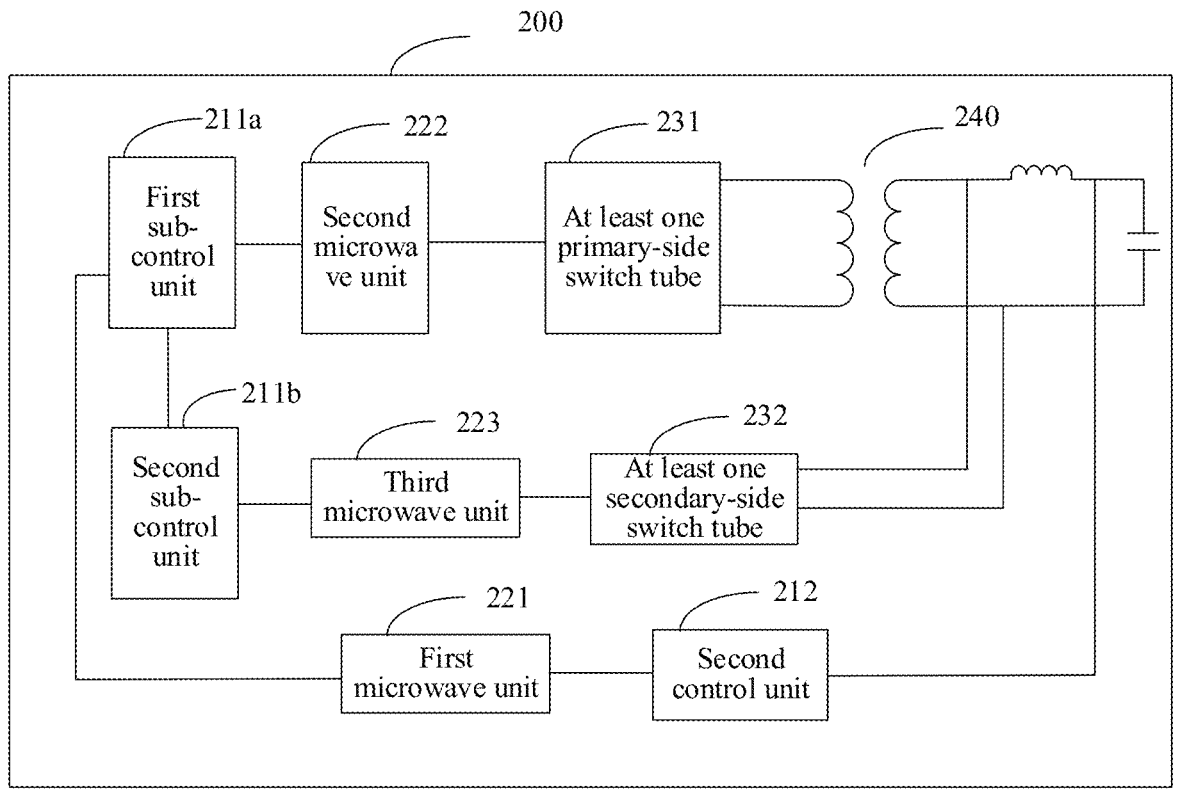
FIG. 7 is a structural schematic diagram of a charger provided by another embodiment of the present application.

The preset frequency of the first control signal and/or the second control signal in this embodiment of the present application may be greater than the second threshold. Taking the first control signal as an example, for example, if the second threshold is 200 KHz, assuming that the preset frequency of the first control signal is 250 KHz, that is, the sum of turning-on and turning-off time of the two switch tubes may be 4 μs. Illustrated with reference to FIG. 7 and FIG. 8, the first sub-control unit 211a outputs a high electric level during the time period (t1-t2); if the dead time is 0.4 μs, the time period (t1-t2) in the figures is 1.6 μs, and the time period (t2-t3) in the figures is 0.4 μs. Thus, turning-on time of the primary-side switch tube 231 within one cycle is 1.6 μs, and during the dead time (t2-t3), of which the time period is 0.4 μs, the first sub-control unit 211a can output a low electric level, so that the primary-side switch tube 231 is completely turned off; and after the primary-side switch tube 231 is completely turned off, the second sub-control unit 211b starts to output a low electric level, so that the secondary-side switch tube 232 is turned on.

It can be understood that when the second sub-control unit 211b outputs a low electric level during the time period (t3-t4), the first sub-control unit 211a can also output a low electric level, so that the primary-side switch tube 231 is in a turned-off state, which can avoid circuit crosstalk caused by mis-turning-on of the primary-side switch tube 231.

In some implementation manners, the preset frequency of the first control signal and the preset frequency of the second control signal may be different, which is not specifically limited in the present application.

It should be understood that the above numerical values are only for illustration, and may also be other numerical values, which should not specifically limit the present application.

It should also be understood that the larger the preset frequency in this embodiment of the present application, the smaller the period of the signal output by the control unit; even if the dead time is set to be small, the microwave unit in this embodiment of the present application can quickly transmit a signal to a switch tube, so that the switch tube can be turned on or turned off quickly; in addition, when the frequency is higher, parasitic capacitance generated by the switch tube is more obvious; however, since the distance between the transmitting end and the receiving end of the microwave unit can be set to be far, even if the frequency is higher, the parasitic capacitance generated by the switch tube cannot be transmitted to other circuit modules or devices, so that circuit crosstalk can be avoided.

As mentioned above, the distance between the transmitting end and the receiving end of the microwave unit may be set to be farther, which will be described in detail below.

Optionally, in some embodiments, a distance between the first transmitting end and the first receiving end included in the first microwave unit is larger than a third threshold; a distance between the second transmitting end and the second receiving end included in the second microwave unit is larger than a fourth threshold; and a distance between the third transmitting end and the third receiving end included in the third microwave unit is larger than a fifth threshold.

In this embodiment of the present application, a distance between the first transmitting end and the first receiving end of the first microwave unit can be larger than a third threshold, for example, if the third threshold is 1 cm, the distance between the first transmitting end and the first receiving end of the first microwave unit can be 1.5 cm, 2 cm, and so on, the present application does not specifically limit here.

In this embodiment of the present application, a distance between the second transmitting end and the second receiving end of the second microwave unit can be larger than a fourth threshold, for example, if the fourth threshold is 0.8 cm, the distance between the second transmitting end and the second receiving end of the second microwave unit can be 1 cm, 1.5 cm, and so on, the present application does not specifically limit here.

In this embodiment of the present application, a distance between the third transmitting end and the third receiving end of the third microwave unit can be larger than a fifth threshold, for example, if the fifth threshold is 0.8 cm, the distance between the third transmitting end and the third receiving end of the third microwave unit can be 1 cm, 1.3 cm, and so on, the present application does not specifically limit here.

In embodiments of the present application, the distance between the first transmitting end and the first receiving end of the first microwave unit 221, the distance between the second transmitting end and the second receiving end of the second microwave unit 222, and the distance between the third transmitting end and the third receiving end of the third microwave unit 223 may be the same, and may also be different, the present application does not specifically limit here.

It can be understood that, since transmission of microwaves does not rely on transmission in medium, the transmission speed is fast, and signal transmission time can be reduced. Regarding a microwave unit, its transmitting end can convert a control signal into a microwave signal and transmits the microwave signal to its receiving end quickly, and the receiving end, after receiving the microwave signal, can convert the microwave signal into the control signal, it is possible to enable a switch tube to get response quickly, that is, it is possible to enable the switch tube to be turned on or turned off quickly.

Figure 9:
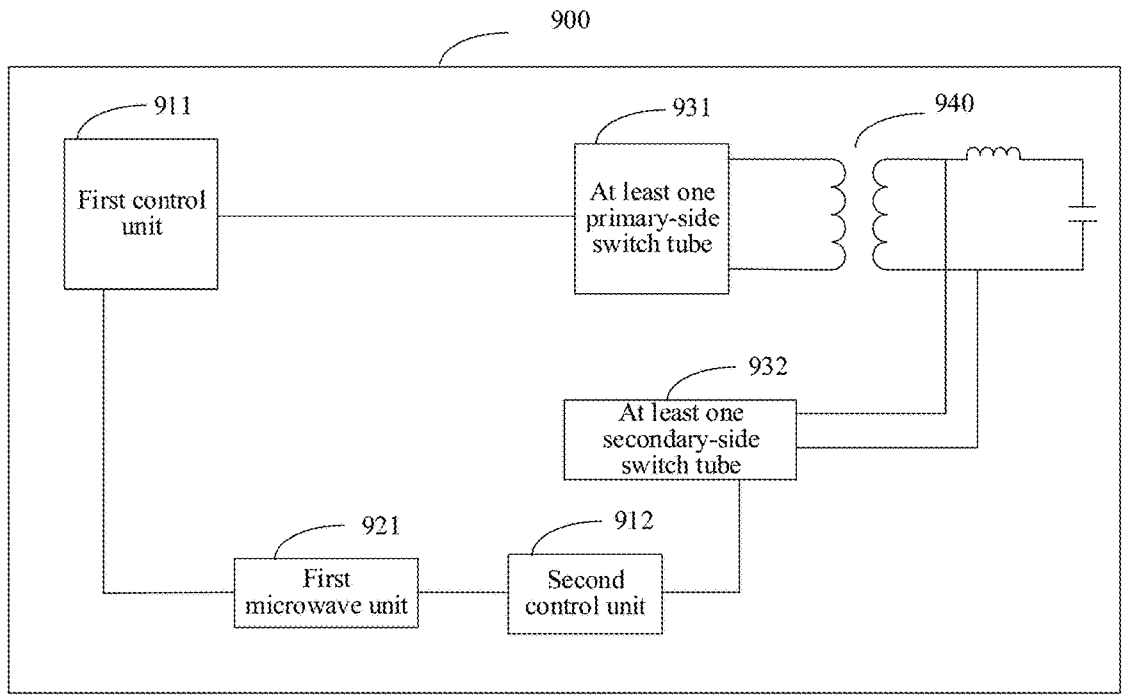
FIG. 9 is a structural schematic diagram of a charger provided by another embodiment of the present application.

As shown in FIG. 9, which is a structural schematic diagram of a charger 900 provided by another embodiment of the present application, the charger 900 can include a first control unit 911, a second control unit 912, a first microwave unit 921, at least one primary-side switch tube 931, at least one secondary-side switch 932, and a transformer 940.

The at least one primary-side switch tube 931 is connected to a primary side of the transformer 940.

The at least one secondary-side switch tube 932 is connected to a secondary side of the transformer 940.

The at least one primary-side switch tube 931 in this embodiment of the present application can be used to perform chopping modulation for a voltage input to the transformer 940, for example, can change a magnitude of a voltage output by the secondary side of the transformer 940 by controlling and adjusting a duty ratio of the primary-side switch tube 931.

The at least one secondary-side switch tube 932 in this embodiment of the present application can be used to perform synchronously rectifying for a voltage output by the transformer 940.

The first control unit 911 is used to output a first control signal, the first signal is used to control the at least one primary-side switch tube to be turned on or turned off.

The second control unit 912 is used to output a second control signal, the second signal is used to control the at least one secondary-side switch tube to be turned on or turned off.

The first control unit 911 in this embodiment of the present application can be used to output the first control signal. The first control signal may be a pulse signal with a cycle of 4 μs, and may also be a pulse signal with a cycle of 0.02 ns, the present application does not specifically limit here.

The second control unit 912 in this embodiment of the present application can be used to output the second control signal. The second control signal may be a pulse signal with a cycle of 4 μs, and may also be a pulse signal with a cycle of 0.02 ns, the present application does not specifically limit here.

The first microwave unit 921 is connected to the first control unit and the second control unit respectively, and is used to transmit a synchronization signal between the first control unit and the second control unit, the synchronization signal is used to synchronize the first control signal and the second control signal.

In this embodiment of the present application, the first microwave unit 921 can transmit a synchronization signal between the first control unit and the second control unit, and the synchronization signal in this embodiment of the present application can be used to synchronize the first control signal and the second control signal.

In the charger provided by this embodiment of the present application, in one aspect, since a response speed of the first microwave unit is fast, the first transmitting end thereof can convert the first control signal into the first microwave signal and quickly transmit it to the first receiving end of the first microwave unit, a driving speed is fast, and dead time can be controlled accurately; even in the condition that dead time of the first control signal is short, the first switch tube can still be quickly turned on or turned off, crosstalk of circuit will not be caused. In another aspect, since transmission of microwaves does not dependent on transmission in media, a distance between the first transmitting end and the first receiving end of the first microwave unit can be set to be far, transmission of parasitic capacitance generated by the first switch tube can be insulated, and thus crosstalk of circuit can also be avoided. At the same time, since isolated communication is performed by using a first microwave unit, rapid two-way communication can be realized, information such as driving information, status information, control information, and other types can be transmitted, anti-interference performance is strong, such that rapidity, flexibility and security of communication can be improved.

Optionally, in some embodiments, the first microwave unit 921 is used to transmit the synchronization signal output by the first control unit to the second control unit.

Optionally, in some embodiments, the first microwave unit 921 is used to transmit the synchronization signal output by the second control unit to the first control unit.

In embodiments of the present application, the first microwave unit 921 can transmit the synchronization signal output by the first control unit 911 to the second control unit 912, such that the second control unit 912 controls turning-on or turning-off time of the at least one secondary-side switch tube 932; the first microwave unit can also transmit the synchronization signal output by the second control unit 912 to the first control unit 911, such that the first control unit 911 controls turning-on or turning-off time of the at least one primary-side switch tube 931.

Figure 10A:
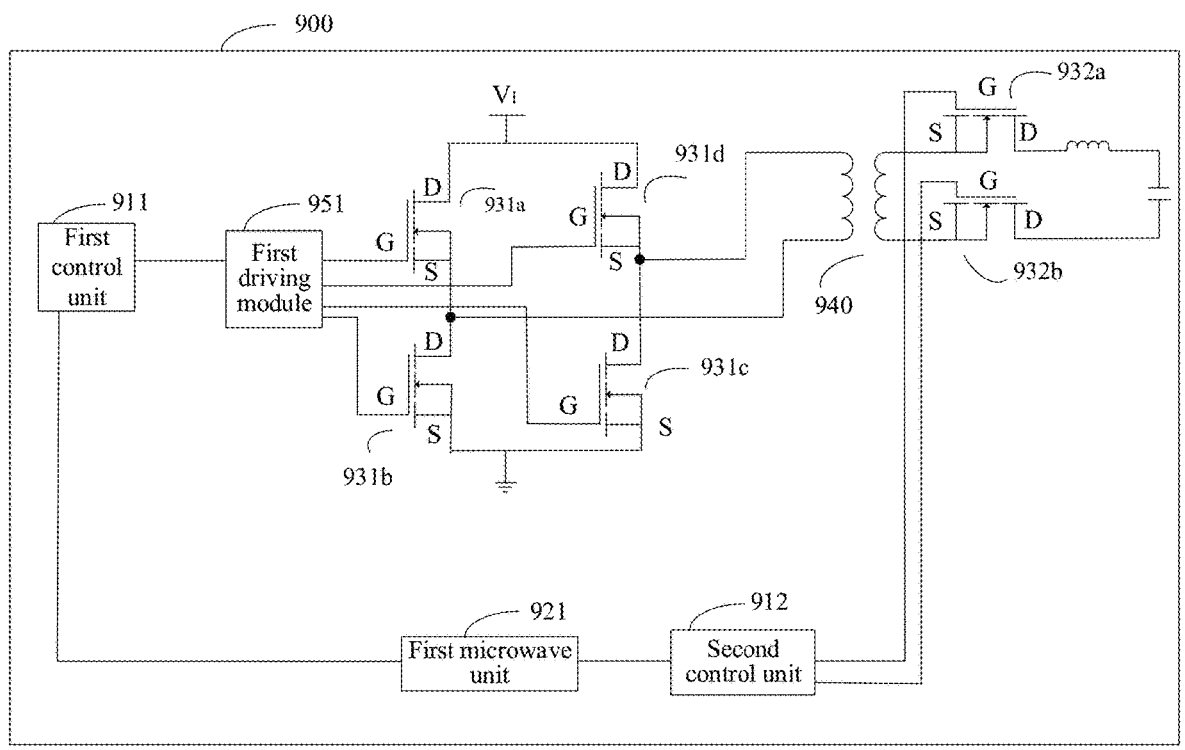
FIG. 10a is a structural schematic diagram of a charger provided by another embodiment of the present application.

Optionally, in some embodiments, as shown in FIG. 10a, the charger 900 can include four primary-side switch tubes and a first driving module 951.

The four primary-side switch tubes 931 form a full-bridge rectifier circuit, which is used to perform rectifying and chopping modulation for AC power input to the charger.

The first driving module 951 is connected to the first control unit and the four primary-side switch tubes respectively, and is used to drive the four primary-side switch tubes to be turned on or turned off according to a first control signal output by the first control unit.

The four primary-side switch tubes in this embodiment of the present application may include a MOS transistor 931a, a MOS transistor 931b, a MOS transistor 931c, and a MOS transistor 931d.

As shown in FIG. 10a, when the first control unit 911 outputs a high electric level signal, if pins of the N-channel MOS transistor 931a and of the N-channel MOS transistor 931c are turned on, the first control signal is transmitted to the first driving module 951, and the first driving module 951 can amplify the received control signal and transmit the amplified signal to the N-channel MOS transistor 931a and the N-channel MOS transistor 931c. At this time, since gate a voltage of the N-channel MOS transistor 931a is higher than source a voltage thereof, and gate a voltage of the N-channel MOS transistor 931c is higher than source a voltage thereof, thus it is possible to make the N-channel MOS transistor 931a and the N-channel MOS transistor 931c be turned on.

When the first control unit 911 outputs a high electric level signal, if pins of the N-channel MOS transistor 931b and of the N-channel MOS transistor 931d are turned on, the first control signal is transmitted to the first driving module 951, and the first driving module 951 can amplify the received control signal and transmit the amplified signal to the N-channel MOS transistor 931b and the N-channel MOS transistor 931d. At this time, since gate a voltage of the N-channel MOS transistor 931b is higher than source a voltage thereof, and gate a voltage of the N-channel MOS transistor 931d is higher than source a voltage thereof, thus it is possible to make the N-channel MOS transistor 931b and the N-channel MOS transistor 931d be turned on.

Figure 10B:
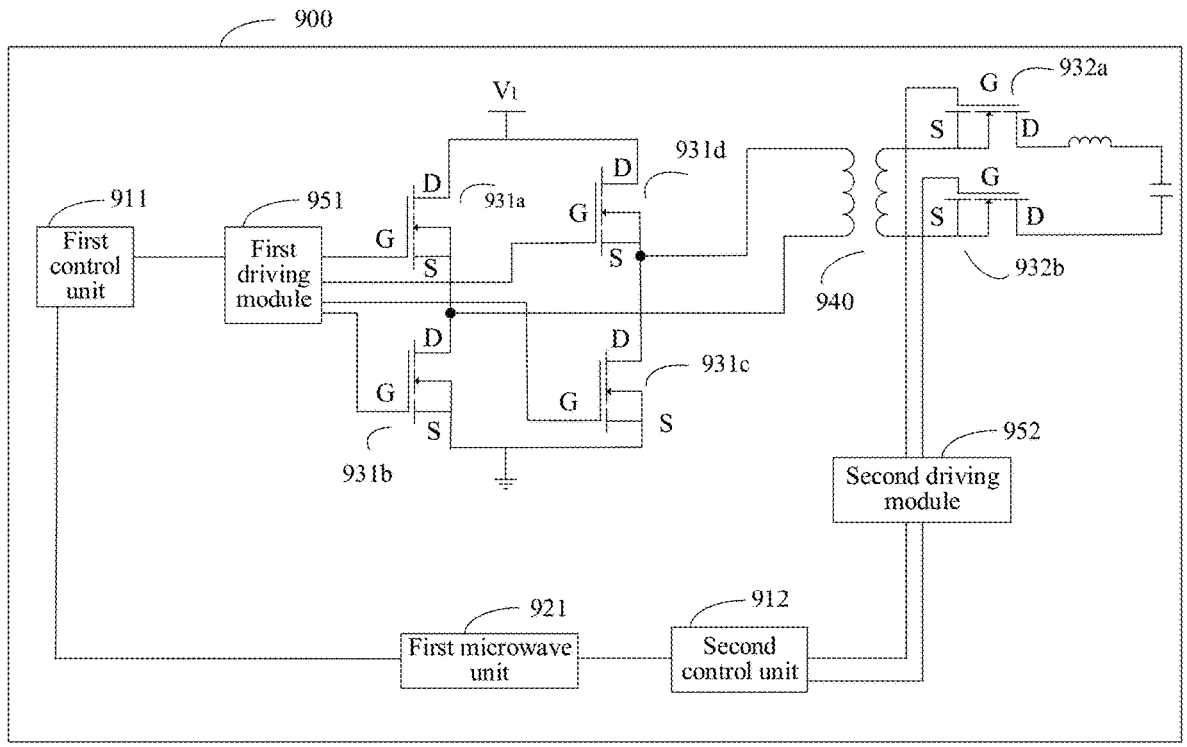
FIG. 10b is a structural schematic diagram of a charger provided by another embodiment of the present application.

Optionally, in some embodiments, as shown in FIG. 10b, the charger 900 can include two secondary-side switch tubes and a second driving module.

Regarding the two secondary-side switch tubes, the two secondary-side switch tubes are used to perform synchronously rectifying for a voltage output by the transformer.

The second driving module is connected to the second control unit and the two secondary-side switch tubes respectively, and is used to drive the two secondary-side switch tubes to be turned on or turned off according to a second control signal output by the second control unit.

The two secondary-side switch tubes in this embodiment of the present application may include two MOS transistors, which are respectively a MOS transistor 932a and a MOS transistor 932b.

In this embodiment of the present application, the second control unit 912 outputs the second control signal, the second driving module 952 can amplify the second control signal and transmit the amplified signal to the MOS transistor 932a and the MOS transistor 932b. If the second control signal is a high electric level signal, at this time, since gate a voltages of the MOS transistor 932a and the MOS transistor 932b are higher than source a voltages thereof, thus it is possible to make the MOS transistor 932a and the MOS transistor 932b be turned on.

Optionally, in some embodiments, dead time of the first control signal and/or the second control signal is less than a first threshold.

Optionally, in some embodiments, a preset frequency of the first control signal and/or the second control signal is greater than a second threshold.

Optionally, in some embodiments, the first microwave unit includes an integrated circuit (IC) chip, and the IC chip is packaged with an extremely high frequency antenna.

The dead time, the preset frequency and the microwave unit in this embodiment of the present application are similar to those mentioned above, and are not repeated here for brevity.

Apparatus embodiments of the present application are described in detail above with reference to FIGS. 1 to 10. Method embodiments of the present application are described below with reference to FIGS. 11 to 12. The method embodiments and the apparatus embodiments correspond to each other, and therefore parts that are not described in detail can refer to the above apparatus embodiments.

Figure 11:
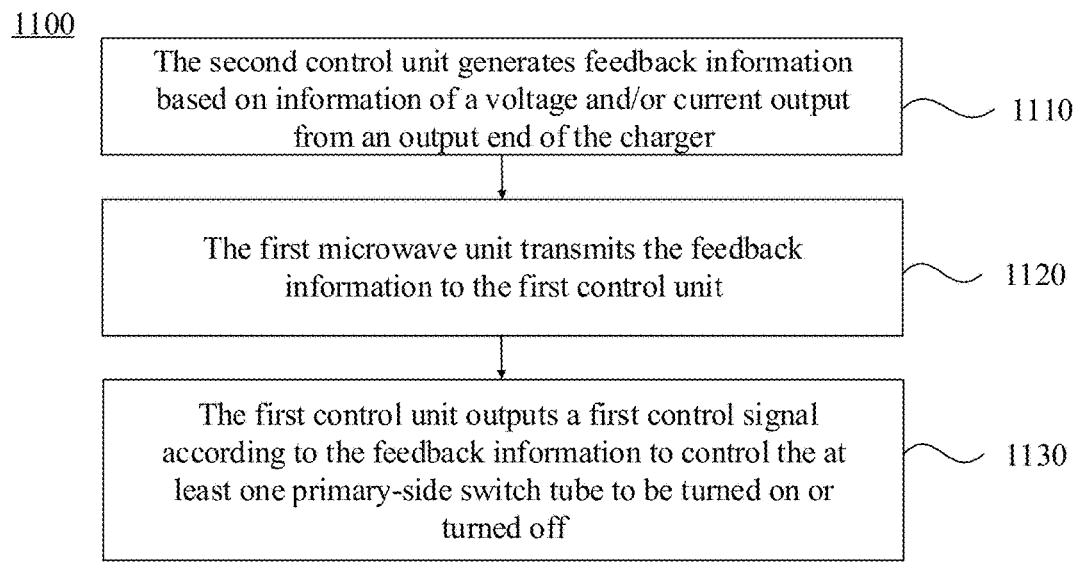
FIG. 11 is a schematic flow chart of a control method provided by an embodiment of the present application.

As shown in FIG. 11, which is a control method 1100 provided by an embodiment of the present application, the method is applicable to a charger, such as the above-described charger 200, the charger includes a transformer, at least one primary-side switch tube, a first control unit, a second control unit, and a first microwave unit, the method 1100 can include operations 1110-1130.

1110, the second control unit generates feedback information based on information of a voltage and/or current output from an output end of the charger.

1120, the first microwave unit transmits the feedback information to the first control unit.

1130, the first control unit outputs a first control signal according to the feedback information to control the at least one primary-side switch tube to be turned on or turned off.

Optionally, in some embodiments, the charger further includes at least one secondary-side switch tube, and the method further includes that: the at least one secondary-side switch tube synchronously rectifies the voltage output by the transformer; the first control unit outputs a second control signal to control the at least one secondary-side switch tube to be turned on or turned off.

Optionally, in some embodiments, the method 1100 further includes that: the first control unit outputs the second control signal according to the information of a voltage/or current to control the at least one secondary-side switch tube to be turned on or turned off.

Optionally, in some embodiments, the charger further includes at least one secondary-side switch tube and a synchronous rectification driving module, and the method 1100 further includes that: the at least one secondary-side switch tube synchronously rectifies the voltage output by the transformer; the synchronous rectification driving module controls at least one secondary-side switch tube to be turned on or turned off.

Optionally, in some embodiments, the charger further includes a second microwave unit and a first driving module, and the method 1100 further includes that: the second microwave unit transmits the first control signal output by the first control module to the first driving module, so that the first driving module drives the at least one primary-side switch tube to be turned on or turned off.

Optionally, in some embodiments, the charger further includes a third microwave unit and a second driving module, and the method 1100 further includes that: the third microwave unit transmits the second control signal output by the first control module to the second driving module, so that the second driving module drives the at least one secondary-side switch tube to be turned on or turned off.

Optionally, in some embodiments, dead time of the first control signal and/or the second control signal is less than a first threshold.

Optionally, in some embodiments, a preset frequency of the first control signal and/or the second control signal is greater than a second threshold.

Optionally, in some embodiments, the first microwave unit and/or the second microwave unit and/or the third microwave unit includes an IC chip, and the IC chip is packaged with an extremely high frequency antenna.

Figure 12:
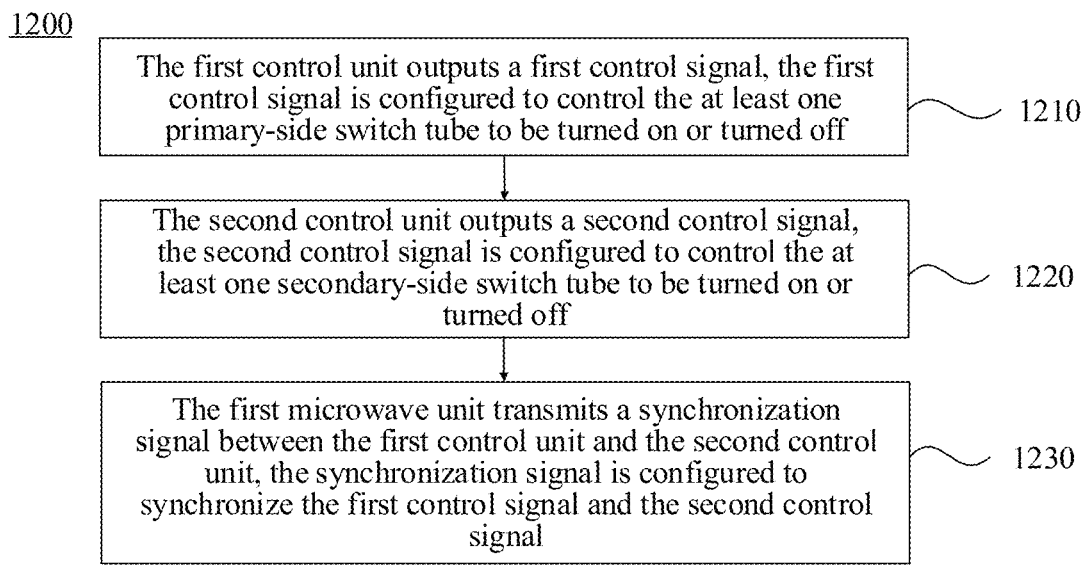
FIG. 12 is a schematic flow chart of a control method provided by another embodiment of the present application.

FIG. 12 is a control method 1200 provided by another embodiment of the present application, the method 1200 is applicable to a charger, such as the above-described charger 900, the charger includes a transformer, at least one primary-side switch tube, at least one secondary-side switch tube, a first control unit, a second control unit, and a first microwave unit, the method 1200 can include operations 1210-1230.

1210, the first control unit outputs a first control signal, the first control signal is configured to control the at least one primary-side switch tube to be turned on or turned off.

1220, the second control unit outputs a second control signal, the second control signal is configured to control the at least one secondary-side switch tube to be turned on or turned off.

1230, the first microwave unit transmits a synchronization signal between the first control unit and the second control unit, the synchronization signal is configured to synchronize the first control signal and the second control signal.

Optionally, in some embodiments, that the first microwave unit transmits a synchronization signal between the first control unit and the second control unit includes that: the first microwave unit transmits the synchronization signal output by the first control unit to the second control unit.

Optionally, in some embodiments, that the first microwave unit transmits a synchronization signal between the first control unit and the second control unit includes that: the first microwave unit transmits the synchronization signal output by the second control unit to the first control unit.

Optionally, in some embodiments, the charger further includes four primary-side switch tubes and a first driving module; the four primary-side switch tubes perform rectifying and chopping modulation for AC power input to the charger; the first driving module drives the four primary-side switch tubes to be turned on or turned off according to the first control signal output by the first control unit.

Optionally, in some embodiments, the charger further includes two secondary-side switch tubes and a second driving module; the two secondary-side switch tubes synchronously rectify a voltage output by the charger; the second driving module drives the two secondary-side switch tubes to be turned on or turned off according to the second control signal output by the second control unit.

Optionally, in some embodiments, dead time of the first control signal and/or the second control signal is less than a first threshold.

Optionally, in some embodiments, a preset frequency of the first control signal and/or the second control signal is greater than a second threshold.

Optionally, in some embodiments, the first microwave unit and/or the second microwave unit and/or the third microwave unit includes an IC chip, and the IC chip is packaged with an extremely high frequency antenna.

Embodiments of the present application further provide a computer-readable storage medium storing computer-executable instructions, and the computer-executable instructions are configured to execute any method of the above control methods 1100 and 1200.

Embodiments of the present application further provide a computer program product, the computer program product includes a computer program stored in a computer-readable storage medium, the computer program includes program instructions, and the program instructions, when being executed by a computer, enable the computer to execute any method of the above control methods 1100 and 1200.

The above embodiments may be implemented in whole or in part by software, hardware, firmware or any other combination. When being implemented in software, they can be implemented in whole or in part in the form of a computer program product. The computer program product includes one or more computer instructions. When the computer program instructions are loaded and executed on a computer, the processes or functions according to the embodiments of the present disclosure are generated in whole or in part. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from one website site, computer, server, or data center to another website site, computer, server, or data center by wire (e.g., coaxial cable, optical fiber, digital subscriber line (DSL)) or wireless (e.g., infrared, wireless, microwave, etc.) manners. The computer-readable storage medium can be any available medium that can be accessed by a computer, or a data storage device such as a server, a data center, or the like that includes an integration of one or more available media. The available media may be magnetic media (e.g., floppy disks, hard disks, magnetic tapes), optical media (e.g., digital video disc (DVD)), or semiconductor media (e.g., solid state disk (SSD)), etc.

Those of ordinary skill in the art can realize that the units and algorithm steps of each example described in conjunction with the embodiments disclosed herein can be implemented in electronic hardware, or a combination of computer software and electronic hardware. Whether these functions are performed by hardware or software depends on the specific application and design constraints of technical solutions. Skilled artisans may implement the described functions using different methods for each particular application, but such implementations should not be considered as being beyond the scope of this application.

In these embodiments provided by the present application, it should be understood that the disclosed systems, apparatuses and methods may be implemented in other manners. For example, the apparatus embodiments described above are only illustrative. For example, the division of the units is only a logical function division. In actual implementation, there may be other division methods, for example, multiple units or components may be combined or integrated into another system, or some features may be ignored, or not implemented. On the other hand, the shown or discussed mutual coupling, or direct coupling, or communication connection may be indirect coupling or communication connection through some interfaces, devices or units, and may be in electrical, mechanical or other forms.

When being used in the present application, although the terms "first", "second", and the like may be used in the present application to describe various devices, these devices should not be limited by these terms. These terms are only used to distinguish one device from another. For example, without changing the meaning of the description, a first device may be called a second device, and likewise, a second device may be called a first device, as long as all appearing "first device" are consistently renamed and all appearing "second device" are renamed consistently. Both the first device and the second device are devices, but may not be the same device.

The units described as separate components may or may not be physically separated, and components displayed as units may or may not be physical units, that is, may be located in one place, or may also be distributed to multiple network units. Some or all of the units may be selected according to actual needs to achieve the purpose of the solutions in these embodiments.

In addition, each functional unit in each embodiment of the present application may be integrated into one processing unit, or each unit may exist physically alone, or two or more units may be integrated into one unit.

The above described are only specific implementations of the present application, but the protection scope of the present application is not limited thereto, any change or replacement which can be easily considered by one of ordinary skilled in the art being familiar with the technical field in the technical scope disclosed by the present application should be covered within the protection scope of the present application. Therefore, the protection scope of the present application should be subject to the protection scope of the claims.

What is claimed is:

1. A charger, comprising:
   a transformer;
   at least one primary-side switch tube configured to perform chopping modulation for a voltage input into the transformer;
   a first control unit;
   a second control unit configured to generate feedback information based on information of a voltage and/or current output from an output end of the charger; and
   a first microwave unit connected to the first control unit and the second control unit respectively and configured to transmit the feedback information to the first control unit;
   wherein the first control unit is configured to output a first control signal according to the feedback information, so as to control the at least one primary-side switch tube to be turned on or turned off;
   wherein the charger further comprises:
   at least one secondary-side switch tube configured to synchronously rectify a voltage output by the transformer;
   a third microwave unit connected to the first control unit; and
   a second driving module connected to the third microwave unit and the at least one secondary-side switch tube respectively:
   wherein the third microwave unit is configured to transmit a second control signal output by the first control unit to the second driving module, so as to enable the second driving module to drive the at least one secondary-side switch tube to be turned on or turned off.

2. The charger according to claim 1, wherein the first control unit is further configured to output the second control signal according to the feedback information to control the at least one secondary-side switch tube to be turned on or turned off.

3. The charger according to claim 1, further comprising:
   a synchronous rectification driving module configured to control the at least one secondary-side switch tube to be turned on or turned off.

4. The charger according to claim 1, further comprising:
a second microwave unit connected to the first control unit; and
a first driving module connected to the first control unit and the at least one primary-side switch tube respectively;
wherein the second microwave unit is configured to transmit the first control signal output by the first control unit to the first driving module, so as to enable the first driving module to drive the at least one primary-side switch tube to be turned on or turned off.

5. The charger according to claim 1, wherein at least one of the first control signal and the second control signal is transmitted in the form of a microwave signal during a part of a transmission process thereof.

6. A method of controlling a charger, wherein the charger comprises a transformer, at least one primary-side switch tube, a first control unit, a second control unit, and a first microwave unit; and the method comprises:
generating, by the second control unit, feedback information based on information of a voltage and/or current output from an output end of the charger;
transmitting, by the first microwave unit the feedback information to the first control unit; and
outputting a first control signal, by the first control unit, according to the feedback information to control the at least one primary-side switch tube to be turned on or turned off;
wherein the charger further comprises at least one secondary-side switch tube configured to synchronously rectify a voltage output by the transformer, a third microwave unit, and a second driving module; and the method further comprises:
transmitting, by the third microwave unit, a second control signal output by the first control unit to the second driving module, so as to enable the second driving module to drive the at least one secondary-side switch tube to be turned on or turned off.

7. The method according to claim 6, further comprising:
outputting the second control signal, by the first control unit, according to the information of a voltage and/or current to control the at least one secondary-side switch tube to be turned on or turned off.

8. The method according to claim 6, wherein the charger further comprises a synchronous rectification driving module, and the method further comprises:
controlling, by the synchronous rectification driving module, the at least one secondary-side switch tube to be turned on or turned off.

9. The method according to claim 6, wherein the charger further comprises a second microwave unit and a first driving module, and the method further comprises:
transmitting, by the second microwave unit, the first control signal output by the first control unit to the first driving module, so as to enable the first driving module to drive the at least one primary-side switch tube to be turned on or turned off.

10. The method according to claim 6, further comprising:
outputting, by the second control unit, the second control signal; and
transmitting, by the first microwave unit, a synchronization signal between the first control unit and the second control unit, wherein the synchronization signal is configured to synchronize the first control signal and the second control signal.

11. The method according to claim 10, wherein the charger further comprises four primary-side switch tubes and a first driving module; and the method further comprises:
performing, by the four primary-side switch tubes, rectifying and chopping modulation for AC power input to the charger; and
driving, by the first driving module, the four primary-side switch tubes to be turned on or turned off according to the first control signal output by the first control unit.

12. The method according to claim 10, wherein the charger further comprises two secondary-side switch tubes and a second driving module; and the method further comprises:
synchronously rectifying, by the two secondary-side switch tubes, a voltage output by the transformer; and
driving, by the second driving module the two secondary-side switch tubes to be turned on or turned off according to the second control signal output by the second control unit.

\* \* \* \* \*